United States Patent [19]

Sekiguchi et al.

[11] Patent Number: 4,573,347
[45] Date of Patent: Mar. 4, 1986

[54] APPARATUS FOR MEASURING FUEL INJECTION ADVANCE ANGLE IN DIESEL ENGINE

[76] Inventors: Akira Sekiguchi; Takeo Ichikawa; Kazuo Inoue; Kyoichi Fujimori; Yutaka Hirano, all of c/o Diesel Kiki Co., Ltd., Higashimatsuyama Plant, 13-26, Yakyu-cho 3-chome, Higashimatsuyama-shi, Saitama 355; Seishi Yasuhara, c/o Nissan Motor Company, Limited, Tsurumi-area, 6-1, Daikoku-cho, Tsurumi-ku, Yokohama-shi, Kanagawa 230, all of Japan

[21] Appl. No.: 598,011

[22] Filed: Apr. 9, 1984

[30] Foreign Application Priority Data

Apr. 8, 1983 [JP] Japan .................................. 58-61022

[51] Int. Cl.$^4$ .......................................... G01M 15/00
[52] U.S. Cl. .................................. 73/119 A; 123/494
[58] Field of Search ................. 73/119 A, 117.3, 116; 123/494, 480, 501, 489

[56] References Cited

U.S. PATENT DOCUMENTS

| | | | |
|---|---|---|---|
| 4,023,403 | 5/1977 | Smith | 73/119 A |
| 4,109,517 | 8/1978 | Dyballa et al. | 73/119 A |
| 4,265,200 | 5/1981 | Wessel et al. | 123/501 |
| 4,416,150 | 11/1983 | Kago et al. | 73/119 A |

Primary Examiner—Stephen A. Kreitman
Attorney, Agent, or Firm—Guy W. Shoup

[57] ABSTRACT

In a fuel injection advance angle measuring apparatus, in which the advance angle is measured on the basis of an injection timing signal produced from, such as, a needle valve lift sensor and a reference timing signal indicative of the reference timing of the engine rotation, in order to remove the noise signal from the signal from the sensor, a masking signal indicating a predetermined period in which the desired component of the injection timing signal is not to be produced, is generated in response to the injection timing signal and the reference timing signal whereby to eliminate the undesired components of the injection timing signal for the measurement of the fuel injection advance angle and to obtain the fuel injection advance angle with high accuracy in measurement.

8 Claims, 21 Drawing Figures

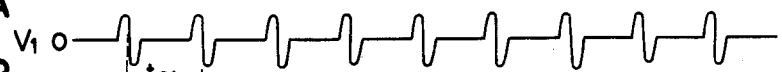
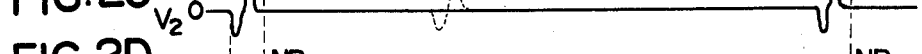
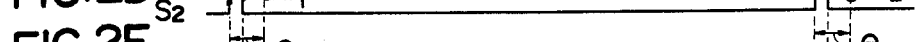
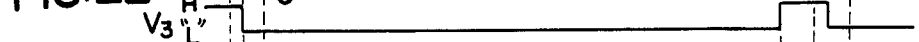
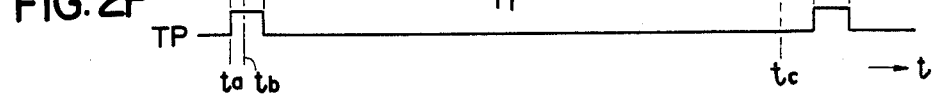
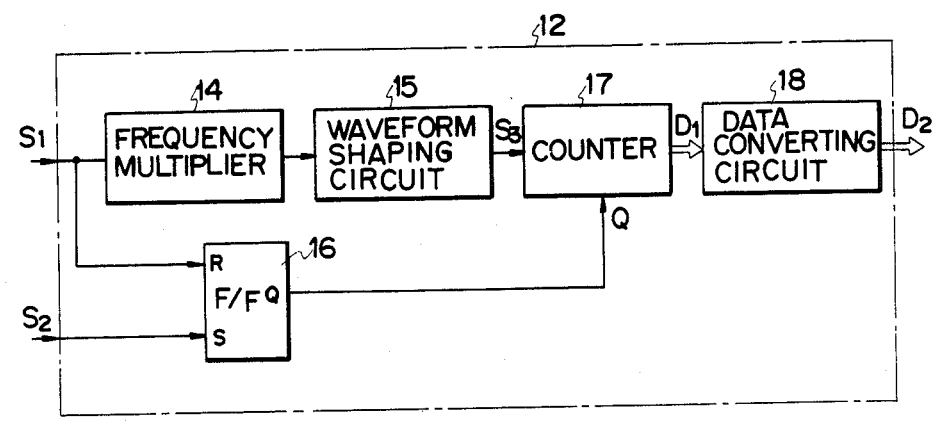
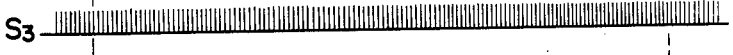

FIG. 5
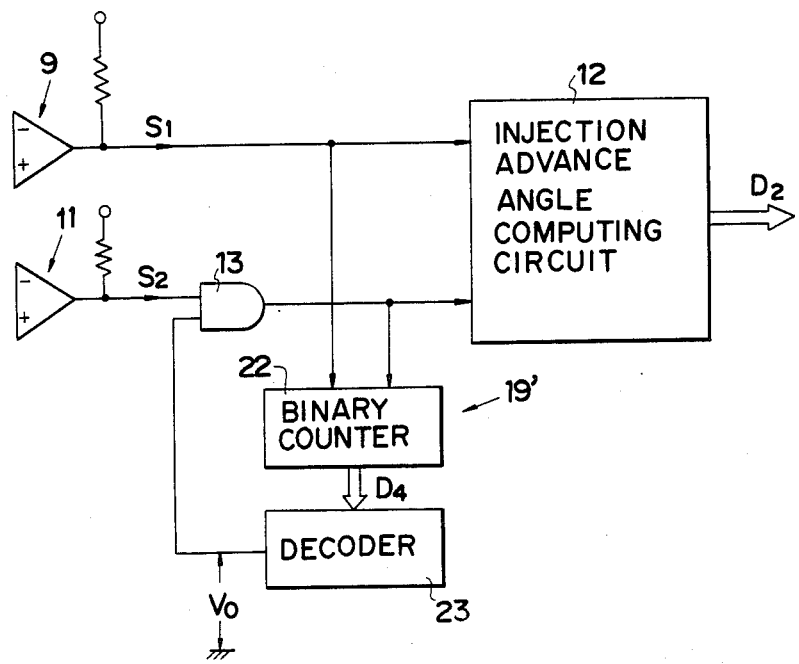
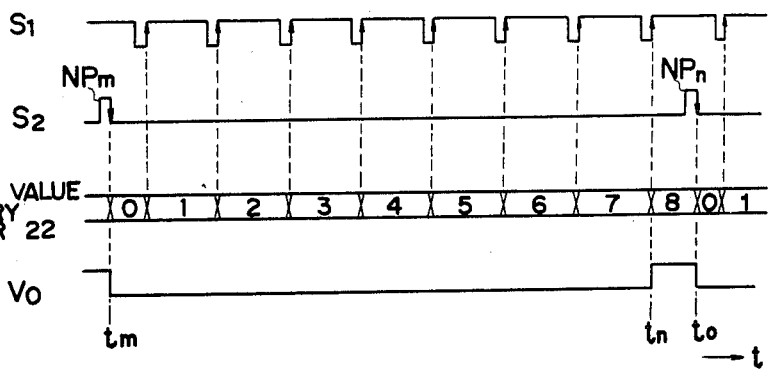

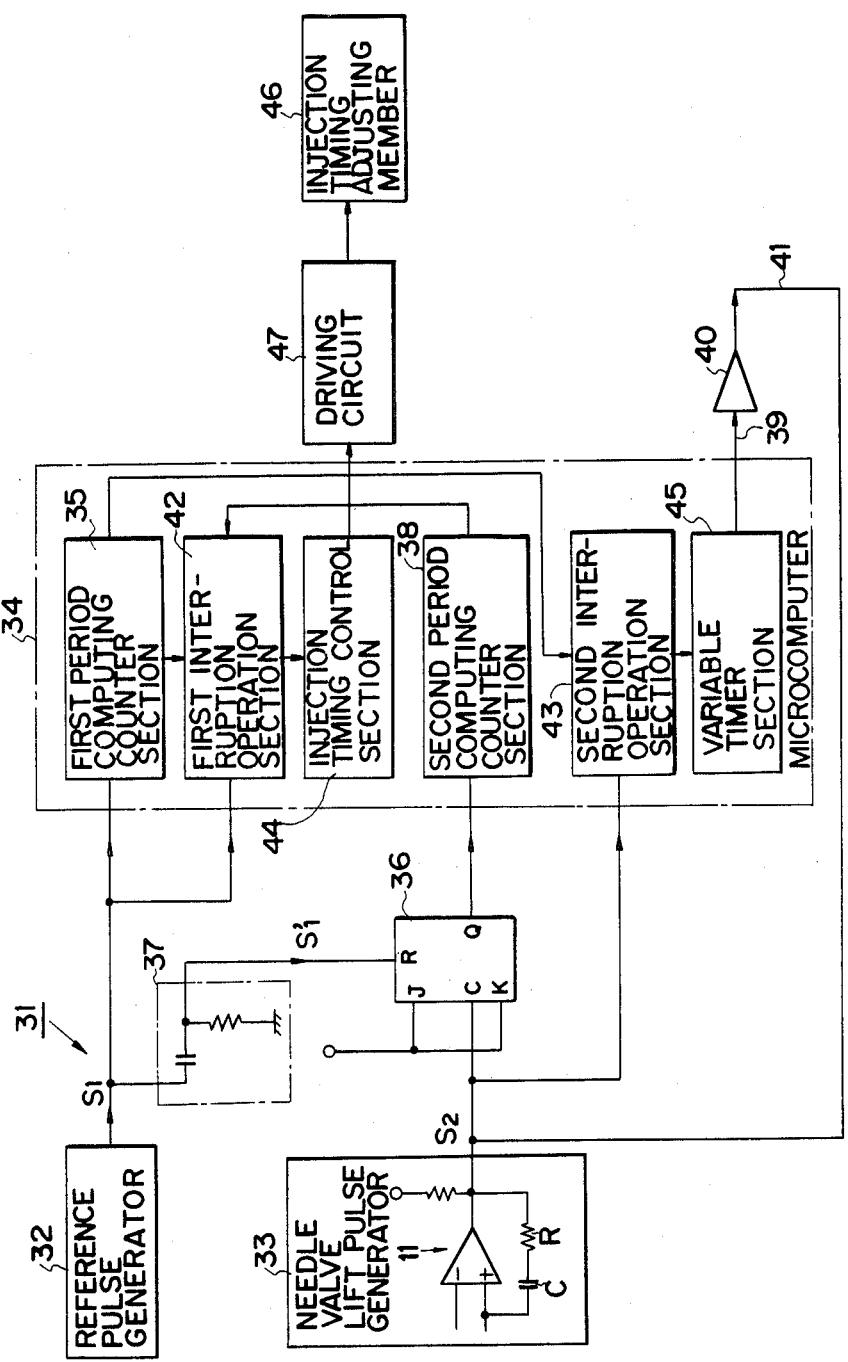

APPARATUS FOR MEASURING FUEL INJECTION ADVANCE ANGLE IN DIESEL ENGINE

BACKGROUND OF THE INVENTION

This invention relates to an apparatus for measuring fuel injection advance angle in a diesel engine.

The measurement of fuel injection advance angle is necessary to effect closed-loop control of the fuel injection timing of a diesel engine. In general, a conventional apparatus for measuring fuel injection advance angle (injection timing) includes such an apparatus as shown for example in Japanese patent application Publication No. 53-65528 (which corresponds to U.S. Pat. No. 4,265,200, DE No. 2 653 046 and UKP No. 1 594 827, in which injection advance angle is measured based on the difference between the lift timing of a needle valve of a fuel injection valve and the top dead center timing of the piston of the engine. In this conventional apparatus, a needle valve lift sensor is mounted on the fuel injection valve of one of plural cylinders and a top dead center sensor is mounted on the crankshaft of the engine for outputting top dead center pulses in response to the top dead center timing of each of the pistons, and the injection advance angle is measured on the basis of the difference in timing between the lift timing pulse from the needle valve lift sensor and the corresponding top dead center pulse from the top dead center sensor. The needle valve lift sensor may, for example, be of the induction coil type which includes a voltage on a coil by the up-and-down motion of the needle valve or of the piezoelectric type which develops a voltage when pressure is applied on the piezoelectric element through the up-and-down motion of the needle valve. However, these types of sensors involve a problem in that the voltages obtained thereby are liable to have pulsive noise superposed thereon because of their high impedance and an error may be introduced into the measurement by the noise components.

The conventional apparatus has still another problem. The needle valve lift sensor picks up, with a time delay, vibrations caused by fuel injection in other cylinders having no needle valve lift sensor or picks up post-injection vibrations or other vibrations of the engine, and the picked up vibrations are output as a lift timing pulse(s), which may introduce an error into the measurement result of the injection advance angle when the level of the pulse is large.

SUMMARY OF THE INVENTION

It is therefore an object of the present invention to provide an improved apparatus for measuring fuel injection advance angle in a diesel engine which is capable of measuring the injection advance angle accurately over the entire speed range of the diesel engine.

It is another object of the present invention to provide an apparatus for measuring fuel injection advance angle in a diesel engine which is capable of eliminating noise components in signals output from the needle valve lift sensor and allowing only the desired signal to be obtained to effect accurate measurement of the fuel injection advance angle.

An apparatus for measuring fuel injection advance angle in a diesel engine according to the present invention comprises a first pulse generator for generating a first detection pulse in response to the lift motion of the needle valve of a fuel injection valve, a second pulse generator for generating a second detection pulse each time the crankshaft of the engine reaches a predetermined reference angle position, a signal generating means for producing an electric signal representing a predetermined crankshaft angle range in response to the first and second detection pulses, and a masking means for masking undesired signal components output from the first pulse generator by the electric signal. The difference in timing between the first detection pulse from which the undesired signal components are omitted by the masking means and the second detection pulse is detected, and the measurement of injection advance angle at each instant is carried out on the basis of the detected timing difference. The signal generating means is provided for producing a signal showing the range of the crankshaft angle in which the desired signal is never generated from the first pulse generator as the electronic signal showing the predetermined crankshaft angle range.

The signal generating means may comprise a computing section for computing the predetermined crankshaft range on the basis of the generation cycle of the second detection pulse and/or a counting section for setting the predetermined crankshaft range on the basis of the number of the second detection pulses.

According to the present invention, the required lift timing pulse of the needle valve lift timing pulse train signal can be obtained separately from other undesired noise components. Therefore, the influence of the various noise signal components can be eliminated and accurate injection advance angle measurement can be attained. Furthermore, since the masking operation for elimination of the noise signal components is carried out in response to the rotational speed of the engine, the elimination of the undesired noise components can be assured over the entire rotational speed range of the engine.

The invention will be better understood and the other objects and advantages thereof will be more apparent from the following detailed description of a preferred embodiment with reference to the accompanying drawings.

BRIEF DESCRIPTION OF THE DRAWINGS

FIGS. 2A to 2F are waveform diagrams for explaining the operation of the apparatus of FIG. 1.

FIG. 3 is a detailed block diagram of an injection advance angle computing circuit as shown in FIG. 1.

FIGS. 4A to 4D are waveform diagrams of signals for explaining the operation of the injection advance angle computing circuit as shown in FIG. 3.

FIG. 5 is a block diagram of another arrangement of the gate control circuit as shown in FIG. 1.

FIGS. 6A to 6D are time charts for explaining the operation of the gate circuit as shown in FIG. 5.

FIG. 7 is a block diagram of another embodiment of the present invention partly shown as a function block diagram.

DESCRIPTION OF THE PREFERRED EMBODIMENTS

Figure 1:
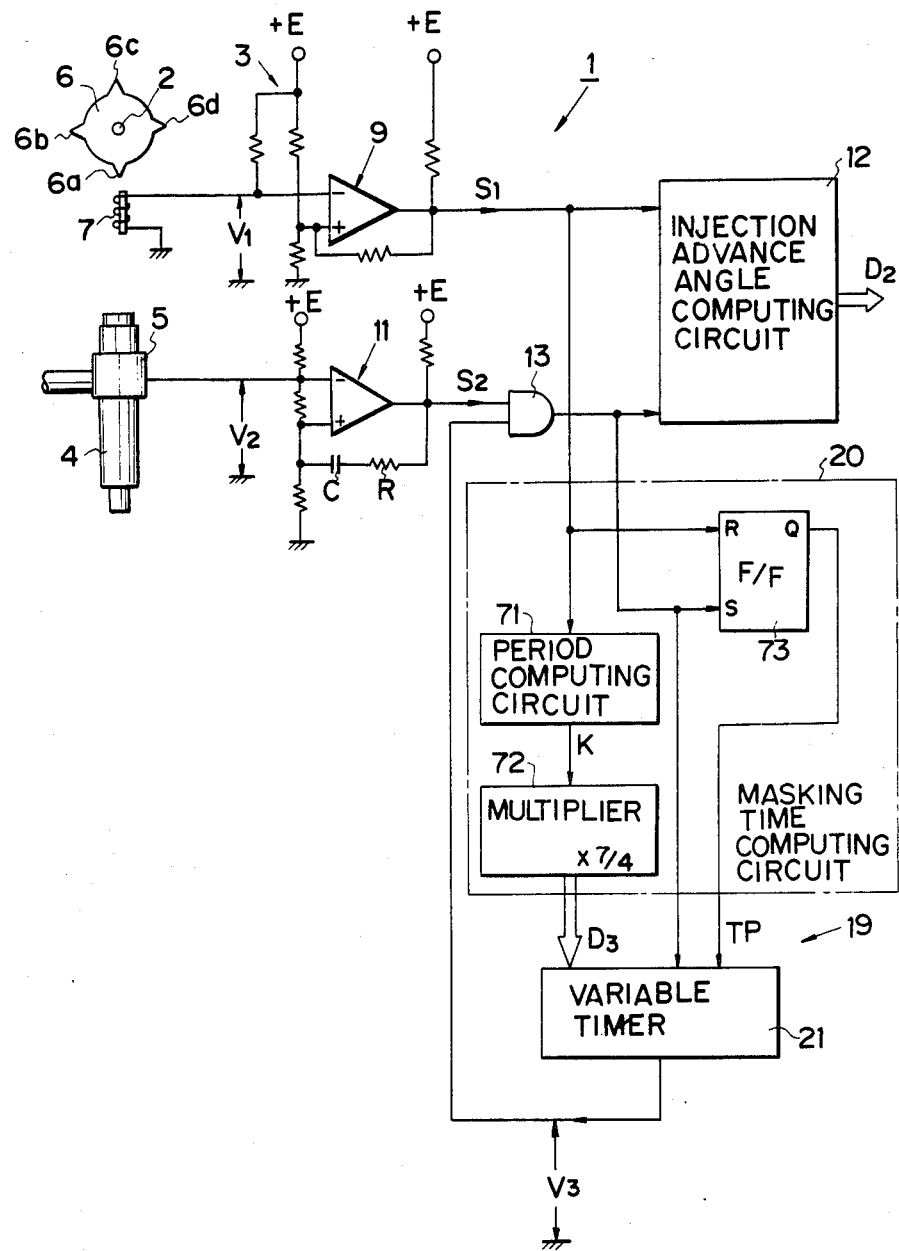
FIG. 1 is a block diagram of an embodiment of an injection advance angle measuring apparatus according to the present invention.

FIG. 1 is a block diagram of an embodiment of an apparatus for measuring injection advance angle according to the present invention. In the embodiment as shown, an apparatus 1 for measuring injection advance angle is adapted for use in a 4-cycle, 4-cylinder diesel engine and measures the injection advance angle (the timing of the beginning of fuel injection) thereof. The apparatus 1 is comprised of a reference pulse generator 3 for outputting a reference pulse train signal $S_1$ formed of reference pulses which are output one each time a crankshaft 2 of the diesel engine (not shown) reaches a predetermined angle position and a needle valve lift sensor 5 mounted on one of four fuel injection valves provided in the diesel engine.

The reference pulse generator 3 includes a rotary member 6 fixed to the crankshaft 2 and an electromagnetic pick-up coil 7 which is so disposed that four cogs $6a$ to $6d$ provided on the periphery of the rotary member 6 at angular intervals of 90° are brought into opposing relation thereto and then depart therefrom sequentially as the rotary member 6 rotates. The inductance of the electromagnetic pick-up coil 7 varies as the cogs $6a$ to $6d$ approach and depart. The reference pulse generator 3 outputs a first detection voltage signal $V_1$ in response to the change in inductance of the electromagnetic pick-up coil 7.

The first detection voltage signal $V_1$ is composed of pulses which have positive and negative components as shown in FIG. 2A and the point between these components when the signal voltage is zero represents the timing when one of the cogs is opposite the electromagnetic pick-up coil 7.

The first detection voltage signal $V_1$ is input to a level discriminating circuit 9 which outputs a reference pulse train signal $S_1$ which represents the "L" level corresponding to the positive component of the first detection voltage signal $V_1$ (FIG. 2B). The rising timings of the reference timing pulses composing the reference pulse train signal $S_1$ coincide with the respective zero crossing points of the first detection voltage signal $V_1$. In the embodiment as illustrated, the timings at which the cogs $6a$ to $6d$ come opposite the electromagnetic pick-up coil 7 coincide with the timings at which the respective cylinder pistons of the engine reach their top dead centers so that the rising timings of the reference pulse train signal $S_1$ represent the top dead center timings. In this embodiment, since the diesel engine is of the 4-cycle, 4-cylinder type, the reference pulse generator 3 outputs eight pulses for every two rotations of the crankshaft 2.

On the other hand, the needle valve lift sensor 5 is so formed that a sensor core (not shown) is moved within a sensor coil (not shown) provided in the injection valve 4 in response to the lifting of the needle valve at the time the fuel injection valve 4 opens. The needle valve lift sensor 5 outputs a second detection voltage signal $V_2$ whose level varies in accordance with the change in the inductance of the sensor coil.

As shown in FIG. 2C, the second detection voltage signal $V_2$ changes in level in the negative and positive directions in response to the up-and-down movement of the needle valve. The second detection voltage signal $V_2$ is input to the level discriminating circuit 11 which is so formed that its discriminating operation is imparted with a hysteresis characteristic by a series feedback circuit comprised of a resistor R and a capacitor C so as to output a needle valve lift pulse train signal $S_2$ as shown in FIG. 2D in response to the input of the second detection voltage signal $V_2$. As can be seen from FIG. 2C and FIG. 2D, the needle valve lift pulse train signal $S_2$ is a pulse train signal composed of lift timing pulses $NP_1, NP_2, \ldots$ which become "H" level when the pulse of the second detection voltage signal $V_2$ are negative. In each of the lift timing pulses, the rising timing indicates the opening timing of the fuel injection valve 4. These lift timing pulses are output one for every eight pulses generated by the reference pulse generator 3 and the output timings of the lift timing pulses are in advance of those of the corresponding reference timing pulses by an injection advance angle $\theta$.

An injection advance angle computing circuit 12 is provided to compute the injection advance angle $\theta$ on the basis of the lift timing pulses and the corresponding reference timing pulses. The reference pulse train signal $S_1$ is directly input to the injection advance angle computing circuit 12 while the needle valve lift pulse train signal $S_2$ is input to the injection advance angle computing circuit 12 through an AND gate 13.

FIG. 3 shows a detailed block diagram of the injection advance angle computing circuit 12. The reference pulse train signal $S_1$ is frequency-multiplied a predetermined number of times by a frequency multiplier 14 and then the signal produced from the frequency multiplier 14 is shaped by a waveform shaping circuit 15. As a result, the signal $S_1$ shown in FIG. 4A is then converted into a count pulse signal $S_3$ as shown in FIG. 4B. On the other hand, the needle lift pulse train signal $S_2$ is applied to the set-terminal of a flip-flop circuit 16 to the reset-terminal of which is applied the reference pulse train signal $S_1$ as a reset signal. Thus the flip-flop circuit 16 is set at the rising timing of each lift timing pulse to have its output rendered "H" level, and is reset at the rising timing of the corresponding reference timing pulse to have its Q output rendered "L" level. More specifically, the output Q from the output terminal Q of the flip-flop circuit 16 becomes high at the timing $t_1, t_2, \ldots$ of the lift of the needle valve and falls at the rising timing $t_1', t_2', \ldots$ of the succeeding reference timing pulse.

The output Q is input as a reset and counting gate pulse to a counter 17, to which the count pulse signal $S_3$ is input as a count pulse, and the counter 17 is reset at the rising of the output Q so as to count the number of pulses of the count pulse signal $S_3$ generated during the "H" level period of the output Q.

Thus, the number counted by the counter 17 varies depending on the injection advance angle $\theta$. The counted output data $D_1$ from the counter 17 is converted into the injection advance angle value by a data converting circuit 18 so that the advance angle data $D_2$ representing the injection advance angle value at each instant is output. The advance angle data $D_2$ is, for example, input to an injection timing controlling circuit (not shown).

Referring to FIG. 1 again, the apparatus 1 of the present invention is provided with a gate control circuit 19 for on-off controlling the AND gate 13 so that only the lift timing pulses generated by the lift of the needle valve are applied to the injection advance angle computing circuit 12 and other noise components are prevented from being applied to the injection advance angle computing circuit 12. The gate control circuit 19 has a masking time computing circuit 20 and a variable timer 21. The masking time computing circuit 20 is a circuit for computing the time which is required for the crankshaft 2 of the diesel engine to rotate 7/4 turns, i.e., a time $T_1$ which is seven times as long as one cycle ($t_{s1}$) of the reference pulse train signal $S_1$, in response to the reference pulse train signal $S_1$ and the needle valve lift pulse train signal $S_2$. The variable timer 21 which is responsive to data $D_3$ indicative of the computed time $T_1$ and is set to a time $T_1$ in response to each falling timing of the pulses of the needle valve lift pulse train signal $S_2$.

The masking time computing circuit 20 has a period computing circuit 71 for computing the period $t_{s1}$ of the reference pulse train signal $S_1$ in response to the reference pulse train signal $S_1$ and a multiplier 72 to which a signal K indicative of the period $t_{s1}$ is applied from the period computing circuit 71. In the multiplier 72, the resulting period $t_{s1}$ is multiplied by 7/4 to produce data $D_3$ indicating the value of $7/4 \times t_{s1}$.

When the variable timer 21 is set to the time determined by data $D_3$ at the time of the falling edge of the lift timing pulse, the level of the masking signal $V_3$ derived from the variable timer 21 becomes "L" (FIG. 2E). When the masking time computing circuit 20 detects the rising time of the reference timing pulse output just after the output of the lift timing pulse the masking time computing circuit 20 outputs a trigger pulse TP in response to the detected rising timing to start the operation of the variable timer 21.

To produce the trigger pulse TP, the masking time computing circuit 20 has a flip-flop circuit 73 responsive to the reference pulse train signal $S_1$ and the needle valve lift pulse train signal $S_2$ obtained through the AND gate 13. The flip-flop circuit 73 is operated similarly to the flip-flop circuit 16 in the injection advance angle computing circuit 12. Therefore, a signal similar to the output Q shown in FIG. 4D is produced as the trigger pulse TP as shown in FIG. 2F. The variable timer 21 is started in response to the falling edge of each trigger pulse TP. As will be seen from the foregoing description, the output Q can be used as the trigger pulse TP. Since the variable timer 21 is set to 7/4 of the rotation cycle of the engine, i.e., $T_1$, the level of the masking signal $V_3$ is changed to "H" after a time corresponding to 7/4 of the rotation cycle ($=T_1$) of the engine has passed from the starting of the timer operation.

Thus, the gate control circuit 19 continues to close the AND gate 13 until eight reference timing pulses have been output after the generation of the needle valve lift timing pulse to prevent signal components other than the desired needle valve lift timing pulse from being input to the injection advance angle computing circuit 12.

The operation of the gate controlling circuit 19 will now be described referring to FIG. 2. When the needle valve is lifted at $t=t_a$ and the lift timing pulse $NP_1$ rises (that is, at the starting time of injection), the variable timer 21 is in its reset state and the level of its output, i.e., the masking signal $V_3$ is "H". Therefore, the AND gate 13 is in its open state and the lift timing pulse $NP_1$ is allowed to be input to the injection advance angle computing circuit 12 and the masking computing circuit 20 through the AND gate 13. The gate control circuit 19 responds to the fall of the lift timing pulse $NP_1$ to make the level of the masking signal $V_3$ become "L" at the time $t=t_b$, and the AND gate 13 is closed. In response to the rising of the reference timing pulse $S_1$ which is output immediately after the fall of the lift timing pulse $NP_1$, the trigger pulse TP is produced and the variable timer 21 is triggered thereby to start the timer operation and the masking signal $V_3$ is kept at "L" level during the period of 7/4 rotations of the engine. The AND gate is maintained closed during this period. Thus, pulses produced on the needle valve lift sensor 5 by vibration of the engine, post-injection, fuel injection in another cylinder or other causes or by other electrical noise signals can be prevented from being input to the injection advance angle computing circuit 12.

At the time $t=t_c$, the level of the masking signal $V_3$ becomes "H" so that the AND gate 13 is opened and the succeeding lift timing pulse $NP_2$ is input to the injection advance angle computing circuit 12 and the masking time computing circuit 20 through the AND gate 13. Thereafter, similar operations are repeated to effect the on-off control of the AND gate 13 repeatedly.

Although the set time of the variable timer 21 is the time required for the engine to rotate 7/4 turns in the foregoing embodiment, the set time may be so determined that the level of the masking time signal $V_3$ becomes "H" just before generation of the succeeding needle valve lift timing pulse. Therefore, the computation to be made by the masking time computing circuit 20 may suitably be selected depending on the number of the cylinders of the engine to obtain the required masking time.

FIG. 5 shows the principal portion of the injection advance angle measuring apparatus where another gate control circuit 19' is employed instead of the gate control circuit 19 as shown in FIG. 1. In FIG. 5, similar or same portions are denoted by similar or the same numerals as those used in FIG. 1. In the embodiment shown in FIG. 5, the gate control circuit 19' has a binary counter 22 to which the reference pulse train signal $S_1$ is input as a counting pulse signal and the needle valve lift pulse train signal $S_2$ is input as a reset signal (refer to FIGS. 6A and 6B). Count output data $D_4$ from the binary counter 22 is input to a decoder 23, which is so constructed that the level of the output voltage $V_0$ becomes "H" when the ouput data $D_4$ represents 8 and the level of the output voltage $V_0$ is kept "L" in other cases.

With this construction, the binary counter 22 is reset and the contents of the output data $D_4$ becomes zero when the lift timing pulse $NP_m$ falls at the time $t=t_m$ (see FIG. 6). As a result, the level of the output voltage $V_0$ becomes "L". After the time $t_m$, the content of binary counter 22 is increased by one for each rise of the reference pulse train signal $S_1$ and the content of the counter 22 become 8 when the eighth reference timing pulse is output at the time $t=t_n$ so that the level of the output voltage $V_0$ is changed from "L" to "H" (FIG. 6C and 6D). Therefore, when the succeeding lift timing pulse $NP_n$ is output, the AND gate 13 is opened and the lift timing pulse $NP_n$ is applied to the injection advance angle computing circuit 12 and the binary counter 22. When the lift timing pulse $NP_n$ falls at the time $t=t_0$, the counter 22 is reset in response thereto and the AND gate 13 is closed again.

As described above, the gate control circuit 19' shown in FIG. 5 also effects on-off control of the AND gate 13 in a similar manner to that of the gate control circuit 19 shown in FIG. 1, and it effectively prevents noise signals other than the desired lift timing pulse from being applied to the injection advance computing circuit 12. Thus, accurate injection advance angle measurement can be attained.

Although the embodiments of FIGS. 1 and 5 are shown separately, these embodiments may be employed in combination. In this case, the embodiments can make up for each other's shortcomings and effect more accurate injection advance angle measurement. More particularly, a combination of the embodiments can eliminate the drawback of the embodiment of FIG. 1 in that the succeeding lift timing pulse may be masked by an abrupt change of the rotational speed (especially an abrupt increase of the speed) and the drawback of the embodiment of FIG. 5 in that an error may be introduced into the count of the binary counter 22 by a possible irregularity in the reference pulse train signal, which error would prevent desired performance of the apparatus.

FIG. 7 shows, partly in function block diagram, a further form of the fuel injection advance angle measuring apparatus according to the present invention which is applied to an injection timing controlling apparatus and employs a microcomputer programmed to effect the computation of the injection advance angle and the masking time for the needle valve lift pulse train signal. The injection advance angle measuring apparatus 31 includes a reference pulse generator 32 for outputting a reference pulse train signal $S_1$ and a needle valve lift pulse generator 33 for outputting a needle valve lift pulse train signal $S_2$. These pulse generators 32 and 33 are substantially the same as the generators used in the embodiment of FIG. 1 for generating the reference pulse train signal $S_1$ and the needle valve lift pulse train signal $S_2$, so that they will not be described in detail here.

The reference pulse train signal $S_1$ is similar to the pulse train signal as shown in FIG. 2B and it is input to a first period computing counter section 35 of the microcomputer 34 to measure the period of the signal $S_1$. The microcomputer 34 is a known one and includes a central processing unit (CPU), a read-only memory (ROM), a random access memory (RAM), etc. The first period computing counter section 35 measures the period $t_{s1}$ of the reference pulse train signal $S_1$ (refer to FIG. 2B). Although the first period computing counter section 35 uses a counter in the microcomputer 34 in the present embodiment, an external counter may be employed if the microcomputer 34 does not have a counter. The reference pulse train signal $S_1$ is also input to the microcomputer 34 as an interruption instruction signal for carrying out a first interruption operation as will be described later. The interruption operation is effected at the rising timing of the reference pulse train signal $S_1$ (indicated by function block 42).

On the other hand, the needle valve lift pulse train signal $S_2$ is applied to a clock terminal C of a J-K flip-flop circuit 36 which is set at the rising timing of the input signal. To the reset terminal R of the J-K flip-flop circuit 36 is input the reference pulse train signal $S_1$ through a differentiating circuit 37 so that a differentiation pulse signal $S_1'$ representing the rising timing of the reference pulse train signal $S_1$ is input as a reset pulse. As a result, the level at the output terminal Q of the J-K flip-flop circuit 36 changes from "L" to "H" at each rising timing of the needle valve lift pulse train signal $S_2$ and becomes "L" at the rising timing of the reference pulse train signal $S_1$ generated immediately after the rising of the needle valve lift pulse train signal $S_2$. This Q output signal is a signal as shown in FIG. 2F and its high level period represents the injection advance angle $\theta$ at that instant. The Q output signal of the J-K flip-flop circuit 36 is input to a second period computing counter section 38 of the microcomputer 34 to measure the time length of the high level period of the Q output signal, i.e., the time period corresponding to $\theta$ as shown in FIG. 2. The second period computing counter section 38 may alternatively be provided outside of the microcomputer as in the case of the first period computing counter section 35 described above.

The needle valve lift pulse train signal $S_2$ is also input to the microcomputer 34 as an interruption instruction signal, and a second interruption operation is carried out at the rising timing of the needle valve lift pulse train signal $S_2$ (indicated by function block 43).

The microcomputer 34 also normally carries out the computation for control of fuel injection timing but also carries out the first and second interruption operation as will be described in detail later upon the rising of the reference pulse train signal $S_1$ and the needle valve lift pulse train signal $S_2$. The function block of the injection timing control is indicated by numeral 44.

Figure 8:
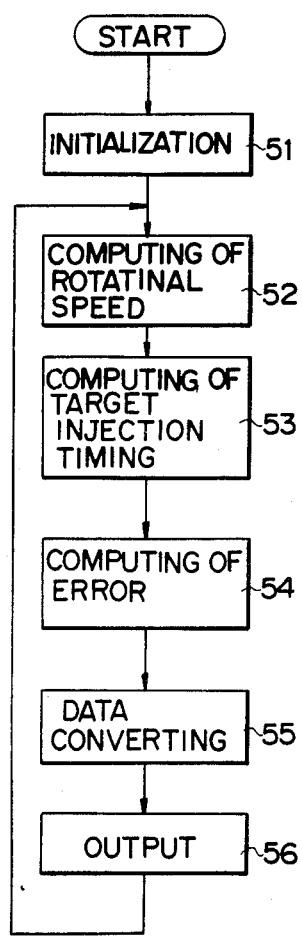
FIGS. 8 to 10 are flowcharts of the programs to be carried out by the microcomputer as shown in FIG. 7.
Figure 9:
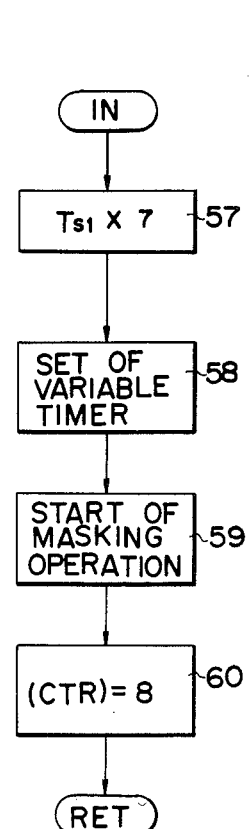

The operation of the injection timing control section 44 will now be described referring to the flowchart of FIG. 8.

Upon application of power, initialization is carried out (step 51), and the rotational speed of the engine is computed at step 52. The computation of the rotational speed of the engine is carried out based on the period $t_{s1}$ of the reference pulse train signal $S_1$ read-in by the first interruption operation as will be described later. Then, a target injection timing corresponding to the data representing the computed rotational speed of the engine is computed at step 53. This can be carried out by reading out the data representing a target injection timing preliminarily stored in ROM as an address value of the data representing the engine speed. The target injection timing data and advance angle data read-in by the first interruption operation as will be described later are compared and computed at step 54 to obtain error data representing the difference between the target injection timing data and the advance angle. In step 55, the error data is converted into a driving signal for driving an injection timing adjusting member 46, so that the advance angle value may coincide with the target injection timing and is input to a driving circuit 47 (step 56). Thereafter, the step 52 is resumed to repeat the above-mentioned operation so as to control the advance angle value to be always coincident with the target injection timing.

The first and second interruption operations are computations for carrying out a masking operation for the needle valve lift pulse train signal $S_2$ so that undesired pulse signal components contained in the output signal from the needle valve lift pulse generator 33 may be effectively masked and only the desired pulse components may be input to the J-K flip-flop circuit 36.

As can be seen from FIG. 2, there is such a relationship that the reference pulse train signal $S_1$ rises eight times while the needle valve lift pulse train signal $S_2$ rises once, and when the needle valve lift pulse train signal $S_2$ rises, the second interruption operation is carried out.

In the second interruption operation, a time which is 7/4 times that for one revolution of the engine based on the data obtained at the first period computing counter section 35, i.e., a time seven times as long as one cycle $T_{s1}$ of the reference pulse train signal $S_1$ of FIG. 2B, is computed (step 57), and the timer time of a variable timer section 45 is set according to the computation result (step 58). The variable timer section 45 is a programmed function of the microcomputer 34 and when the variable timer is set, the level of an output line 39 for the timer of the microcomputer 34 is changed from "H" to "L" and the masking operation is started (step 59). The output level of a buffer amplifier 40 of open-collector type becomes "L" in response thereto. An output line 41 of the buffer amplifier 40 is connected to an output terminal of the needle valve lift pulse generator 33 and since a level discriminating circuit provided at the output stage of the needle valve lift pulse generator 33 is also of open-collector type, a so-called wired AND gate is constituted. Therefore, when the level of the output line 41 becomes "L", the level of the needle valve lift pulse train signal $S_2$ also becomes "L" and is brought into the so-called masked state. Then, 8 is set in a counter CTR for the first interruption operation as will be described later (step 60) and the execution of the main program (injection timing control) is resumed.

Although an unmasked period results during the computing period and the response delay period of the various circuits before the masking operation as described above has been carried out in response to the lift operation of the needle valve, the level discriminating circuit 11 does not respond to noise pulses occurring after the needle lift pulse for a predetermined time period because the level discriminating circuit 11 is imparted with a hysteresis characteristic by a CR feedback circuit as in the case of FIG. 1 so that there is caused no problem due to the delay in starting of the masking operation.

The masking operation as described above is carried out for a time period equal to 7/4 of one period of rotation of the engine so that a desired masking operation can be carried out for the needle valve lift pulse train signal $S_2$ in a manner similar to that of the embodiment of FIG. 1.

Figure 10:
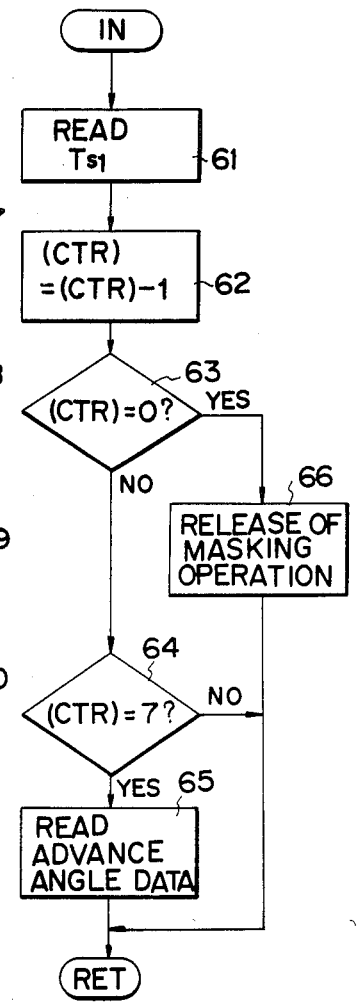

In the apparatus 31, the first interruption operation is carried out to prevent the succeeding lift timing pulse from also being erroneously masked by a prolongation of the masking period caused by abrupt increase in the engine rotational speed. As shown in FIG. 10, the first interruption operation reads in, in response to the interruption instruction, the period $t_{s1}$ of the reference pulse train signal $S_1$ measured in the first period computing counter section 35 and stores it in the RAM at step 61. Then, one is subtracted from the content (CRT) of the counter CRT (step 62) and whether the content of the counter CRT is 0 or not is determined at step 63. If the result is "NO", then it is determined at step 64 whether the content of the counter CRT is 7 or not. If the result is "YES", the advance angle value data obtained by the second period computing counter section 38 is read in and stored in the RAM (step 65) and the processing returns to the main program. If the result of the determination at step 64 is "NO", the interruption operation is discontinued and the processing returns to the main program. If the result in step 63 is "YES", the timer issues a command to discontinue the masking operation (step 66) and the processing returns to the main program. The discontinuance of the masking operation is based on the same operation principle of that of the embodiment of FIG. 5. This prevents possible erroneous masking of the next needle valve lift timing data, even when the rotational speed of the engine changes abruptly.

Thus, it is possible to realize a fuel injection advance angle measuring apparatus which utilizes a program run by a microcomputer. The program described above is only an example and other programs may be employed instead.

We claim:

1. An apparatus for measuring fuel injection advance angle of a diesel engine, comprising:
   a first pulse generator for generating first detection pulses in response to the lift movement of a needle valve of a fuel injection valve;
   a second pulse generator for generating second detection pulses each time the crankshaft of the engine reaches a predetermined reference angular position;
   a signal generating means responsive to the first and the second detection pulses for producing an electric signal showing a desired angle range of the crankshaft;
   a masking means for masking undesired signal components produced from said first pulse generator in accordance with the electric signal; and
   means for detecting an injection advance angle value in accordance with the first detection pulses obtained through said masking means and the second detection pulses;
   wherein said signal generating means includes a computing section for computing said desired angle range of the crankshaft on the basis of the generating period of the second detection pulses.

2. An apparatus as claimed in claim 1, wherein said signal generating means has a first means for computing the period of the second detection pulses, a second means for computing the desired angle range of the crankshaft by multiplying the period computed by said first means by a predetermined coefficient, and a third means for producing said electric signal in accordance with data showing the desired angle range of the crankshaft computed by said second means.

3. An apparatus as claimed in claim 2, wherein said coefficient is determined in accordance with the frequency of the first detection pulses and the frequency of the second detection pulses.

4. An apparatus as claimed in claim 2, wherein said third means is a variable timer responsive to said data showing the desired angle range of the crankshaft for producing a signal by which said masking means is rendered operative only during the period when said crankshaft is within the desired angle range.

5. An apparatus as claimed in claim 1, wherein said signal generating means has means for computing the period of the second detection pulses, means for computing data showing the desired angle range of the crankshaft by multiplying the computed period by a predetermined coefficient which is determined in accordance with the frequency of the first detection pulses and the frequency of the second detection pulses, means for generating a timing signal indicating the timing of the second detection pulse generated just after the occurrence of the first detection pulse, and a variable timer in which the timer time is set in accordance with the data showing the desired angle range of the crankshaft and the timer operation starts by the application of the timing signal.

6. An apparatus as claimed in claim 1, wherein said signal generating means includes a counting section for setting said desired angle range of the crankshaft on the basis of the number of the second detection pulses.

7. An apparatus as claimed in claim 1, wherein said signal generating means includes a counter which is reset in response to the first detection pulses and to which the second detection pulses are applied as counting pulses, and means responsive to the output from said counter for producing a signal showing the angle range of the crankshaft corresponding to the period when the counting result of said counter reaches a predetermined value from zero.

8. An apparatus for measuring a fuel injection advance angle of a diesel engine, comprising:
- a first pulse generator for generating first detection pulses in response to the lift movement of a needle valve of a fuel injection valve;
- a second pulse generator for generating second detection pulses each time the crankshaft of the engine reaches a predetermined reference angular position;
- a first signal generator responsive to at least the second detection pulses for generating a first data showing a first desired angle range of the crankshaft on the basis of a period of the generation of the second detection pulses;
- a second signal generator responsive to at least the second detection pulses for generating a second data showing a second desired angle range of the crankshaft on the basis of the number of the second detection pulses;
- a selecting means for selecting data showing a shorter angle range of the crankshaft of the first and the second data;
- a masking means for masking undesired signal components produced from said first pulse generator in accordance with the selected data selected by said selecting means; and
- means for detecting injection advance angle value in accordance with the first detection pulses obtained through said masking means and the second detection pulses.

* * * * *